(12) United States Patent
Krishnapura et al.

(10) Patent No.: US 8,862,824 B2
(45) Date of Patent: Oct. 14, 2014

(54) TECHNIQUES FOR MANAGING POWER AND PERFORMANCE OF MULTI-SOCKET PROCESSORS

(71) Applicant: Intel Corporation, Santa Clara, CA (US)

(72) Inventors: Sheshaprasad G. Krishnapura, Mountain View, CA (US); Vipul Lal, Santa Clara, CA (US); Ty H. Tang, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 13/627,441

(22) Filed: Sep. 26, 2012

(65) Prior Publication Data
US 2014/0089603 A1 Mar. 27, 2014

(51) Int. Cl.
*G06F 12/08* (2006.01)
(52) U.S. Cl.
CPC ................................. *G06F 12/0831* (2013.01)
USPC .......................................... 711/118; 713/322
(58) Field of Classification Search
None
See application file for complete search history.

(56) References Cited

U.S. PATENT DOCUMENTS

| 8,473,765 | B2 * | 6/2013 | Huang et al. | 713/322 |
|---|---|---|---|---|
| 2011/0225591 | A1 * | 9/2011 | Wada et al. | 718/103 |
| 2012/0060022 | A1 * | 3/2012 | Huang et al. | 713/2 |
| 2012/0284553 | A1 * | 11/2012 | Chen | 713/324 |
| 2013/0007493 | A1 * | 1/2013 | Murakami et al. | 713/322 |
| 2013/0205149 | A1 * | 8/2013 | Chen | 713/322 |
| 2014/0032894 | A1 * | 1/2014 | Zhao et al. | 713/100 |
| 2014/0089690 | A1 * | 3/2014 | Fukuda | 713/300 |

FOREIGN PATENT DOCUMENTS

JP 2008217628 A * 9/2008

* cited by examiner

*Primary Examiner* — Kevin Verbrugge
(74) *Attorney, Agent, or Firm* — Kacvinsky Daisak Bluni PLLC

(57) ABSTRACT

Examples are disclosed for managing power and performance of multi-socket processors. In some examples, a utilization rate of a first processor circuitry in a first processor socket may be determined. An active memory ratio of a cache for the first processor circuitry may be compared to a threshold ratio or a data traffic rate between the first processor circuitry and a second processor circuitry in a second processor socket may be compared to a threshold rate. According to some examples, a first power state of the first processor circuitry may be changed based on the determined utilization rate. The first power state may also be changed based on the comparison of the active memory ratio to the threshold ratio or the comparison of the data traffic rate to the threshold rate.

30 Claims, 6 Drawing Sheets

500

```
┌─────────────────────────────────────────────┐
│ MONITOR ACTIVITY OF A FIRST PROCESSOR CIRCUITRY IN A │
│ FIRST PROCESSOR SOCKET TO DETERMINE A UTILIZATION    │
│      RATE OF THE FIRST PROCESSOR CIRCUITRY           │
│                      502                             │
└─────────────────────────────────────────────┘
                        │
┌─────────────────────────────────────────────┐
│        MAKE COMPARISON(S) TO THRESHOLD(S)            │
│  ┌───────────────────────────────────────┐   │
│  │  COMPARE AN AMR OF CACHE FOR THE FIRST │   │
│  │  PROCESSOR CIRCUITRY TO A THRESHOLD RATIO │ │
│  │                 506                    │   │
│  └───────────────────────────────────────┘   │
│  ┌───────────────────────────────────────┐   │
│  │ COMPARE A DTR BETWEEN THE FIRST PROCESSOR │ │
│  │ CIRCUITRY AND A SECOND PROCESSOR CIRCUITRY IN │
│  │       A SECOND PROCESSOR SOCKET         │  │
│  │                 508                    │   │
│  └───────────────────────────────────────┘   │
│                     504                              │
└─────────────────────────────────────────────┘
                        │
┌─────────────────────────────────────────────┐
│   CHANGE A POWER STATE OF THE FIRST PROCESSOR        │
│  CIRCUITRY BASED ON THE UTILIZATION RATE AND AT      │
│       LEAST ONE COMPARISON TO A THRESHOLD            │
│                      510                             │
└─────────────────────────────────────────────┘
```

*FIG. 5*

TECHNIQUES FOR MANAGING POWER AND PERFORMANCE OF MULTI-SOCKET PROCESSORS

BACKGROUND

Computing devices such as servers may be configured to include multiple processors in separate processor sockets. Each processor may include processor circuitry having one or more processor cores. Also, point-to-point interconnects may communicatively couple processor circuitry resident in one processor socket to neighboring processor circuitry resident in one or more other processor sockets. These point-to-point interconnects may operate according to one or more industry technologies such as the Intel® QuickPath Interconnect ("QPI") technology or HyperTransport™ Consortium's HyperTransport ("HT") technology.

In some server configurations, processor circuitry resident in separate processor sockets may allow for non-uniform memory access (NUMA) between their respective caches such as last level caches (LLCs). For example, QPI or HT operated point-to-point interconnects may allow for a second processor circuitry's cache to be accessed by a first processor circuitry. The access to the first processor circuitry's cache may be done in a manner that has less access latency than having the second processor circuitry access non-cache or main memory.

Existing power management solutions for multi-socket server systems may include switching a given processor circuitry's performance or power state (frequency/voltage) to operate at lower power levels when the given processor circuitry is underutilized or has idle processing capacity. For example, a first processor circuitry operating in a first processor socket may be operating at a low power state yet a second processor circuitry operating in a second processor socket may be operating at a higher power state. The second processor circuitry operating at the higher power state may still request access to the first processor circuitry's cache even though the first processor circuitry may be operating at a lower power state.

BRIEF DESCRIPTION OF THE DRAWINGS

FIG. 5 illustrates an example logic flow for managing power and performance of multi-socket processors.

DETAILED DESCRIPTION

As contemplated in the present disclosure, a second processor circuitry operating at a higher power state may still request access to a first processor circuitry's cache even though the first processor circuitry may be operating at a lower power state. The second processor circuitry may see no performance reduction due to the power state discrepancy as long as components relevant to access to the first processor circuitry's cache (e.g., memory controller, rings, cache, etc.) reside in the first processor circuitry's uncore module. For example, separate circuitry possibly resident on a separate die or chip may be part of the first processor circuitry's uncore module and as long as components relevant to the access belong to a different clock/voltage domain than the first processor circuitry's core module, the second processor may be able to keep these uncore module components in a higher power state compared to the first processor circuitry's power state. However, some processor circuitry designs are moving at least some previously uncore module components relevant to accessing a cache for a processor circuitry to the processor circuitry's core module. As a result of moving the uncore module components to the core module, the second processor circuitry may see a performance reduction due to the lower power state of components relevant to accessing the cache of the first processor circuitry. It is with respect to these and other challenges that the examples described herein are needed.

In some examples, techniques are implemented for managing power and performance of multi-socket processors. For these examples, activity of a first processor circuitry in a first processor socket may be monitored to determine a utilization rate. The first processor circuitry may be coupled to a second processor in a second processor socket via one or more communication links capable of providing access to a cache for the first processor circuitry. An active memory to total memory ratio hereinafter referred to as "active memory ratio" of the cache for the first processor circuitry may be compared to a threshold ratio. Also, a data traffic rate between the first and second processor circuitry via the one or more communication links may be compared to a threshold rate. A first power state of the first processor circuitry may then be changed based on the utilization rate. The first power state may also be changed based on the comparison of the active memory ratio to the threshold ratio or based on the comparison of the data traffic rate to the threshold rate.

Figure 1:
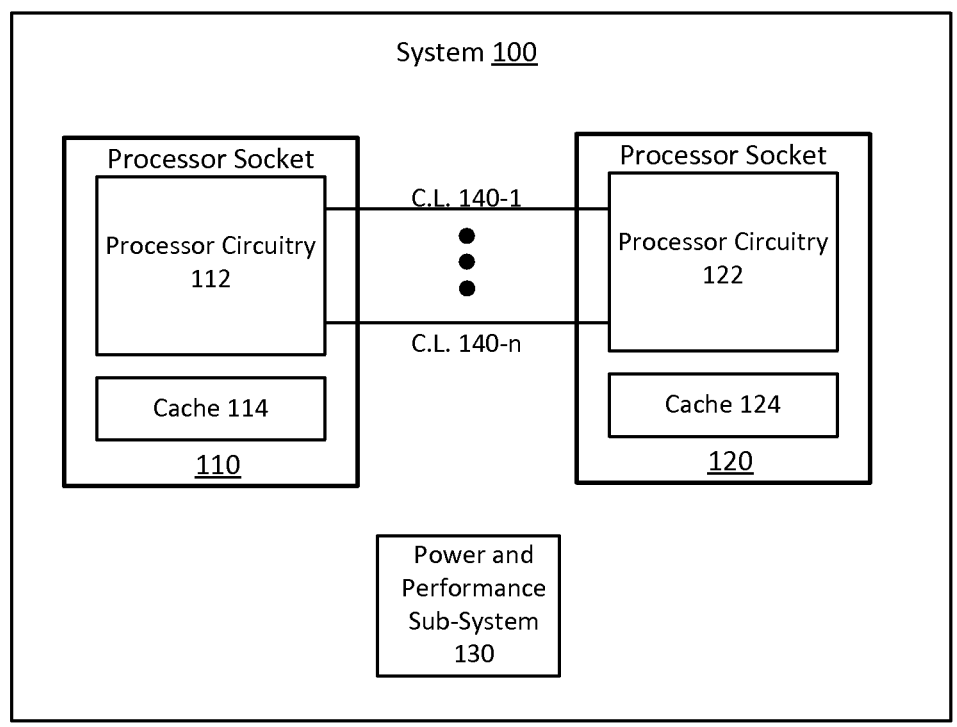
FIG. 1 illustrates an example system.

FIG. 1 illustrates an example system 100. As shown in FIG. 1, system 100 includes a processor socket 110, a processor socket 120 and a power and performance sub-system 130. Processor socket 110 is shown in FIG. 1 as including a processor circuitry 112 and a cache 114. Processor socket 120 is shown in FIG. 1 as including a processor circuitry 122 and a cache 124. According to some examples, as shown in FIG. 1, processor circuitry 112 may be coupled to processor circuitry 122 via communication links (C.L.s) 140-1 to 140-n, where "n" is any positive integer greater than 1. Although system 100 is shown in FIG. 1 as including two processor sockets, any number of processor sockets are contemplated with each having respective processor circuitry, cache and communication links to separately couple or interconnect the processor circuitry. Also, cache 114 or 124 may include multi-level caches such as a last level cache (LLC).

According to some examples, cache 114 for processor circuitry 112 may operate at the same clock frequency or power management domain as processor circuitry 112. Also, cache 124 for processor circuitry 122 may operate at the same clock frequency or power management domain as processor circuitry 122. For these examples, processor circuitry 122 may provide access to cache 124 by processor circuitry 112 via one or more communication links from among C.L.s 140-1 to 140-n.

In some examples, system 100 may be part of a multi-socket server that implements a power management scheme that may result in processor circuitry 112 for processor socket 110 being in a high power state while processor circuitry 122 for processor socket 120 is in a low power state (e.g., due to underutilized processing capacity). The power management scheme, for examples, may be implemented in accordance with an industry standard or specification such as the Advanced Configuration and Power Interface (ACPI) specification, including progeny and variants. For these examples, as mentioned above, if cache 124 operates at the same clock frequency or power management domain as processor circuitry 122, access to cache 124 by processor circuitry 112 may also slow down.

According to some examples, slowing down processor circuitry 112's access to cache 124 may unacceptably impact performance of one or more applications (not shown) being executed on or by processor circuitry 112. These one or more applications may be utilizing both cache 114 and cache 124 while being executed on or by processor circuitry 112. Further, an operating system (OS) that may be managing the power management scheme for the multi-socket server may be unaware of these applications using both cache 114 and 124. Since the OS is unaware of the use of both caches, the OS may place processor circuitry 122 in a lower power state to conserve power at a potential cost of reducing performance of the applications being executed on processor circuitry 112.

In some examples, power and performance sub-system 130 may include logic, features or modules capable of monitoring activity of processor circuitry 112 or 122 to determine a utilization rate. For these examples, the utilization rate may indicate whether the processor circuitry may likely be placed in or is already in a lower power state. Also, as described more below, power and performance sub-system 130 may include logic, features or modules capable of comparing an active memory ratio of cache 114 or 124 to a threshold ratio or comparing a data traffic rate between processor circuitry 112 and processor circuitry 122 via one or more communication links from among C.L.s 140-1 to 140-n.

According to some examples, the active memory ratio of cache 114 or 124 may indicate an amount of available active memory compared to a total memory capacity. For example, if cache 114 has a total memory capacity of 20 megabytes (MBs) and the amount of available active memory is 5 MBs, the active memory ratio would be 5/20 or 0.25. In some examples, the threshold ratio may be determined based on a ratio that may indicate that cache for a processor circuitry has an acceptable amount of active memory to allow access to applications executing on processor circuitry in another processor socket. For example, a threshold ratio may be 0.5 for cache 124. The threshold ratio of 0.5 may indicate that over 50% of cache 124 needs to be available for access in order for applications being executed on processor circuitry 112 to utilize cache 124. Other threshold ratios are contemplated and this disclosure is not limited to a threshold ratio of 0.5.

In some examples, the data traffic rate between processor circuitry 112 and processor circuitry 122 via one or more communication links from among C.L.s 140-1 to 140-n may be an inter-socket traffic rate. For these examples, C.L.s 140-1 to 140-n may include QPI or HT point-to-point interconnects. The inter-socket traffic rate may be based on a number of QPI or HT formatted data packets exchanged between processor circuitry 112 and processor circuitry 122 over a given period of time. A high data traffic rate may be indicated by an inter-socket traffic rate that may provide an indication that processor circuitry 112 and processor circuitry 122 are actively sharing access to their respective caches via the exchange of data packets associated with read or write accesses to caches. For example, a threshold rate associated with the high data traffic may include, but is not limited to, an inter-socket traffic rate of greater than 5 gigabytes (GBs) per second or 5 GB/s.

According to some examples, power and performance sub-system 130 may also include logic, features or modules to change a power state of processor circuitry 112 or processor circuitry 122. For these examples, the power state may be changed based on a determined utilization rate and based on the comparison of the active memory ratio to the threshold ratio (e.g., 0.5) and/or based on the comparison of the data traffic rate to the threshold rate (e.g., 5 GB/s). For example, if processor circuitry 112 has a need to utilize cache 124, power and performance sub-system 130 may determine that the utilization rate for processor circuitry 122 indicates processor circuitry 122 is underutilized. Also, for this example, the active memory ratio may be above the threshold ratio (e.g., greater than 0.5) and/or the data traffic rate may be above the threshold rate (e.g., above 5 GB/s). Based on processor circuitry 122 being underutilized and having adequate active memory available in cache 124 and/or a relative high data traffic rate, power and performance sub-system 130 may raise the power state of processor circuitry 122.

Figure 2:
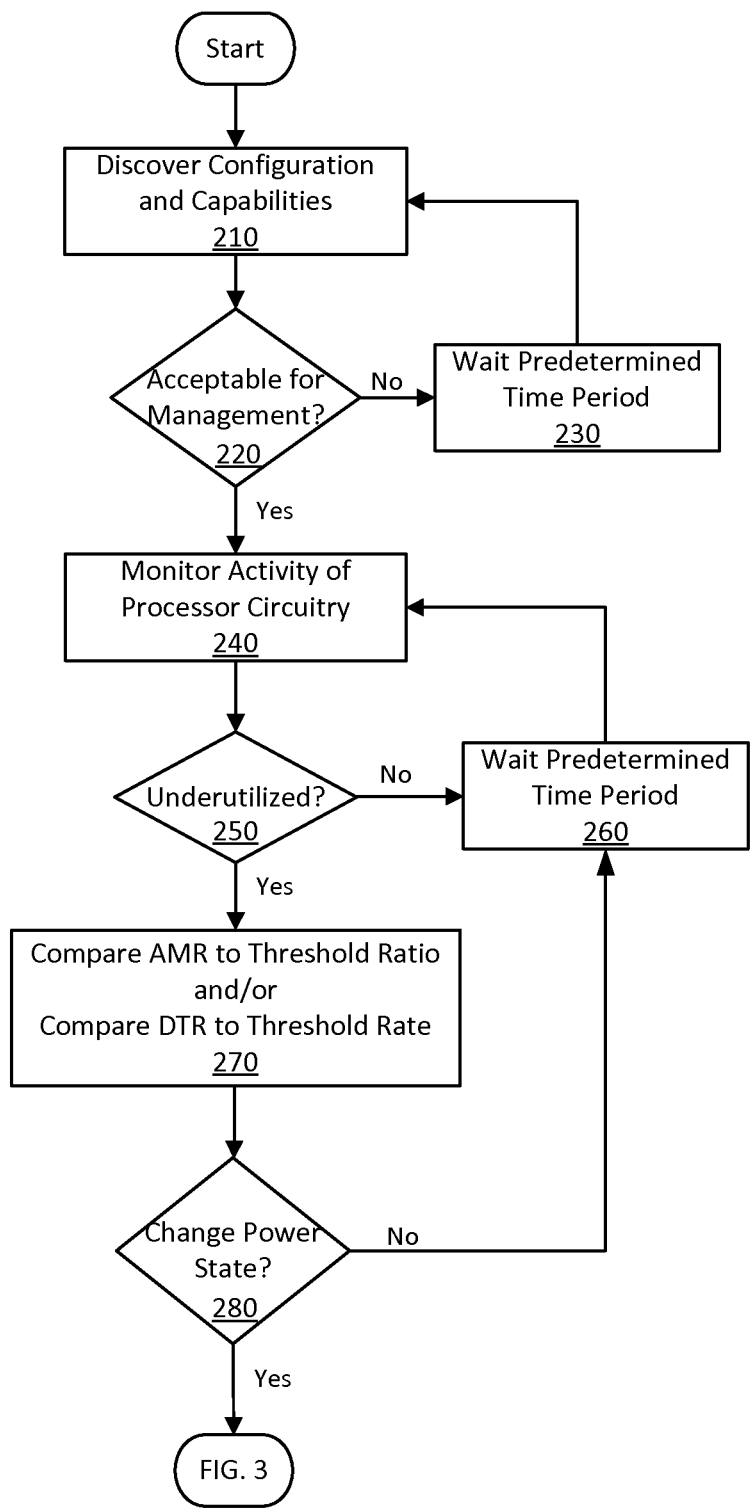
FIG. 2 illustrates an example flow diagram for changing a power state.

FIG. 2 illustrates an example flow diagram for changing a power state. In some examples, elements of system 100 as shown in FIG. 1 may be used to illustrate example operations related to the flow chart depicted in FIG. 2. The described example operations are not limited to implementations on system 100 or to the elements described therein for FIG. 1.

Moving from the start to block 210 (Discover Configuration and Capabilities), power and performance sub-system 130 may include logic, features or modules to discover a configuration and capabilities of a server system. According to some examples, power and performance sub-system 130 may discover that the server system is a multi-socket processor system similar to system 100 in FIG. 1. Power and performance sub-system 130 may also discover what communication links couple the multi-socket processor system. For example, power and performance sub-system 130 may discover that communication links 140-1 to 140-n are QPI point-to-point interconnects. Power and performance sub-system 130 may also discover the type of memory access scheme processor circuitry 112 and 122 employ to access their respective caches such a non-uniform memory access (NUMA) scheme. Power and performance sub-system 130 may also discover if processor circuitry 112 or processor circuitry 122 have their respective caches operating at the same clock frequency or power management domain.

Proceeding from block 210 to decision block 220 (Acceptable for Management?), power and performance sub-system 130 may also include logic, features or modules to determine whether the discovered configuration and capabilities of the server system is acceptable for management by performance sub-system 130. In some examples, the server system may be acceptable if the server system includes a plurality of processor sockets, implements a NUMA scheme for access to caches and processor circuitry in each processor socket has caches that operate at the same clock frequency or power management domain as their respective processor circuitry. If the server system includes all three of these configurations or capabilities the process moves to block 240. Otherwise, the process moves to block 230.

Moving from decision block 220 to block 230 (Wait Predetermined Time Period), power and performance sub-system 130 may wait a predetermined time period. In some examples, the predetermined time period may be an amount of time that allows for the server system to possibly change its configuration. For example, during the initial discovery of configuration and capabilities only a first processor socket may have been powered up or initialized. Subsequent processor sockets may then be powered up or initialized once the first processor socket is stable or if additional processing capacity is needed by the server system. After the predetermined time period is reached, the process moves back to block 210.

Moving from decision block 220 to block 240 (Monitor Activity of Processor Circuitry), power and performance sub-system 130 may also include logic, features or modules to monitor activity of processor circuitry. According to some examples, power and performance sub-system 130 may be aware that processor circuitry 112 is operating at a high power state and cache 114 may be nearing its memory capacity and processor circuitry 122 may likely need to access cache 124 for processor circuitry 122. For these examples, power and performance sub-system 130 may also monitor processor circuitry 122's activity to determine a utilization rate.

Proceeding from block 240 to decision block 250 (Underutilized?), power and performance sub-system 130 may also include logic, features or modules to determine whether the utilization rate of processor circuitry 122 indicates underutilization. In some examples, underutilization may indicate that it is unlikely that cache 124 is currently being used by processor circuitry 122 and also may indicate that processor circuitry 122 may soon be placed in a lower power state or is already in a lower power state. In some examples, the utilization rate may be the current operating frequency of processor circuitry 122 compared to its highest possible operating frequency. If the utilization rate indicates that processor circuitry 122 is underutilized, the process moves to block 250. Otherwise, the process moves to block 260.

Moving from decision block 250 to block 260 (Wait Predetermined Time Period), power and performance sub-system 130 may again wait a predetermined time period. In some examples, the predetermined time period may allow for possible changes in a utilization rate for processor circuitry 122. For example, a burst of processing demands on processor circuitry 122 may have been initially monitored. Subsequent monitoring after the burst of processing may indicate that processor circuitry 122 may now be underutilized. After the predetermined time period has elapsed, the process moves back to block 240.

Moving from decision block 250 to block 270 (Compare AMR to Threshold Ratio and/or Compare DTR to Threshold Rate), power and performance sub-system 130 may also include logic, features or modules to compare an AMR to a threshold ratio and/or compare DTR to a threshold rate. According to some examples, power and performance sub-system 130 may gather information to determine an AMR for cache 124 of processor circuitry 122 and compare the AMR to a threshold ratio (e.g., 0.5). Power and performance sub-system 130 may also gather information to determine a DTR for information exchanged via C.L.s 140-1 to 140-n and then compare the DTR to a threshold rate (e.g., 5 GB/s).

Proceeding from block 270 to decision block 280 (Change Power State?), power and performance sub-system 130 may also include logic, features or modules to determine whether to change a power state of processor circuitry. In some examples, processor circuitry 122 may be in a low power state. For these examples, based on processor circuitry 122 being underutilized and on either the comparison of the AMR to the threshold ratio or the comparison of the DTR to the threshold rate, the power state of processor circuitry 122 may be changed to a higher power state. For example, if processor circuitry 122 is underutilized and the AMR is found to be above the threshold ratio, the process moves to FIG. 3. Alternatively and/or in addition to the AMR comparison, if the DTR is found to be above the threshold rate, the process also moves to FIG. 3. Otherwise, if neither the AMR is above the threshold ratio nor the DTR is above the threshold rate, the process moves to block 260.

Figure 3:
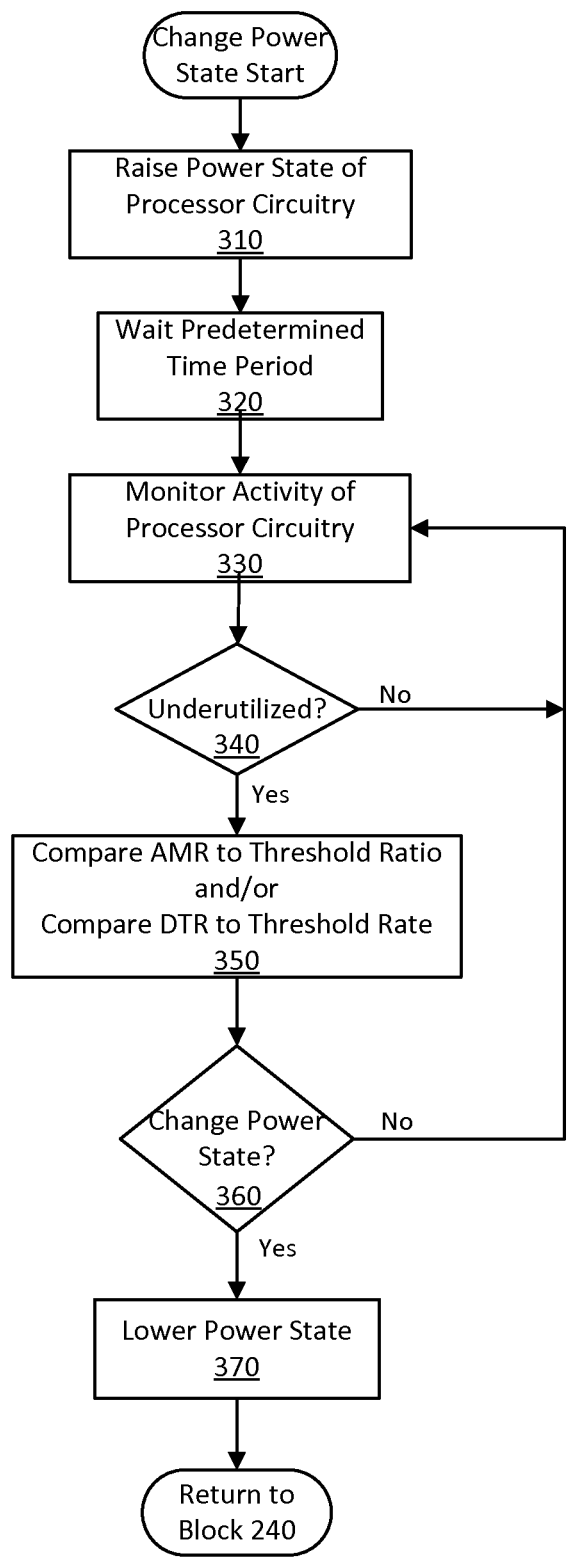
FIG. 3 illustrates an example flow diagram for raising and lowering a changed power state.

FIG. 3 illustrates an example flow diagram for raising and lowering a changed power state. In some examples, elements of system 100 as shown in FIG. 1 and the previous processes described in FIG. 2 may be used to illustrate example operations related to the flow chart depicted in FIG. 3. The described example operations are not limited to implementations on system 100 or to the elements described therein for FIG. 1. The example operations are also not limited to the previous processes described in FIG. 2.

Moving from change power state start to block 310 (Raise Power State of Processor Circuitry), power and performance sub-system 130 may include logic, features or modules to cause the power state of processor circuitry to be raised. According to some examples, power and performance sub-system 130 may have determined that cache 124 for processor circuitry 122 was being shared with processor circuitry 112. Also power and performance sub-system 130 may have determined that in order to maintain processor circuitry 112 at a higher performance level the power state of processor circuitry 122 should be raised. For these examples, the raised power state may enable applications executing on processor circuitry 112 to utilize cache 124 at a higher clock frequency than would otherwise be the case if processor circuitry 122 were operating in a lower power state.

Proceeding from block 310 to block 320 (Wait Predetermined Time Period), power and performance sub-system 130 may wait a predetermined time period. In some examples, the predetermined time period may be based on an estimated amount of time for the applications executing on processor circuitry 112 to possibly utilize cache 124 or may be based on a fixed time period.

Proceeding from block 320 to block 330 (Monitor Activity of Processor Circuitry), power and performance sub-system 130 may once again monitor activity of the processor circuitry. According to some examples, power and performance sub-system may monitor processor circuitry 122 to determine if its processing demands have either increased or remain at a low or underutilized level.

Proceeding from block 330 to decision block 340 (Underutilized?), power and performance sub-system 130 may determine whether the monitored activity indicates if the processor circuitry is underutilized. If underutilized, the process moves to block 350. Otherwise the process moves back to block 330.

Moving from decision block 340 to block 350 (Compare AMR to Threshold Ratio and/or Compare DTR to Threshold Rate), power and performance sub-system 130 may compare a newly determined AMR to a threshold ratio and/or compare a newly determined DTR to a threshold rate.

Proceeding from block 350 to decision block 360 (Change Power State?), power and performance sub-system 130 may now determine whether to change the power state of the processor circuitry. According to some examples, processor circuitry 122 may be changed back to a low power state if power and performance sub-system 130 determines that processor circuitry 122 is underutilized and based on the comparison of the AMR to the threshold ratio or the comparison of the DTR to the threshold rate. For example, if processor circuitry 122 is underutilized and the AMR is found to be below the threshold ratio, the process moves to block 370. Alternatively and/or in addition to the AMR comparison, if the DTR is found to be below the threshold rate, the process also moves to block 370. Otherwise, if the AMR is above the threshold ratio or the DTR is above the threshold rate, the process moves to block 330.

Moving from decision block 360 to block 370 (Lower Power State), power and performance sub-system 130 lowers the power state of the processor circuitry. In some examples, processor circuitry 122 may be lowered to a lower power state and the process returns to block 240 of FIG. 2. For these examples where the process returns to block 240, power and performance sub-system 130 may monitor the activity of processor circuitry 122 as mentioned above.

Figure 4:
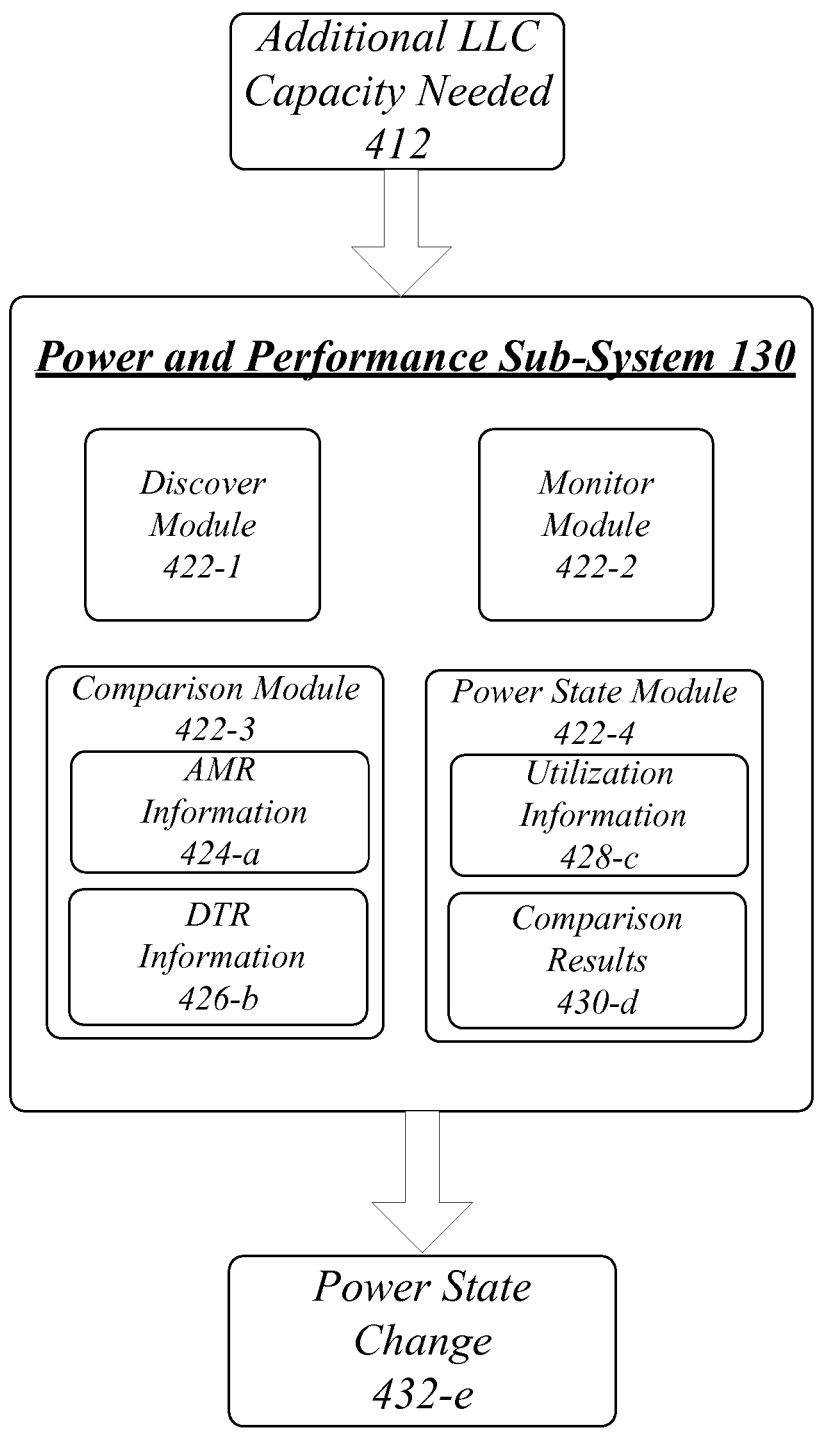
FIG. 4 illustrates an example apparatus.

FIG. 4 illustrates an example apparatus 400. Although the apparatus 400 shown in FIG. 4 has a limited number of elements in a certain topology, it may be appreciated that the apparatus 400 may include more or less elements in alternate topologies as desired for a given implementation.

The apparatus 400 may comprise a computer-implemented apparatus 400 that implements power and performance sub-system 130. The computer-implemented apparatus 400 may be arranged to execute one or more software components 422-*a*. It is worthy to note that "a" and "b" and "c" and similar designators as used herein are intended to be variables representing any positive integer. Thus, for example, if an implementation sets a value for a=5, then a complete set of software components 422-*a* may include modules 422-1, 422-2, 422-3, 422-4 or 422-5. The embodiments are not limited in this context.

According to some examples, apparatus 400 may be capable of being located with a computing device such as a multi-processor socket server (e.g., located at or with system 100). For these examples, apparatus 400 may be included in or implemented by a processor or processor circuitry, implemented as part of firmware (e.g., BIOS), implemented by an OS, implemented as a middleware application or implemented as a user-level utility. The examples are not limited in this context.

In some examples, if implemented in a processor, the processor may be generally arranged to execute one or more software components 422-*a*. The processor can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed to implement apparatus 400.

According to some examples, apparatus 400 may include a discover module 422-1. Discover module 422-1 may be capable of discovering a configuration and capabilities of a server system (e.g., system 100). For these examples, discovering a configuration and capabilities may include, but is not limited to, discovering whether the server system has multiple processor sockets, types and configurations of communication links between processor circuitry in processor sockets, types of memory access schemes to share access to caches of different processor circuitry or whether those caches are operating on the same or different clock frequency as their respective processor circuitry.

In some examples, apparatus 400 may also include a monitor module 422-2. Monitor module 422-2 may be capable of monitoring activity of processor circuitry. For these examples, monitor module 422-2 may monitor the activity in order to provide utilization information for processor circuitry in a processor socket. The monitored activity, for example, may also facilitate the determination of communication activity between processor circuitry located within separate processor sockets (e.g., to determine DTR). The monitored activity may also facilitate the determination of an AMR associated with a cache for processor circuitry.

In some examples, apparatus 400 may also include a comparison module 422-3. Comparison module may be capable of comparing AMR information 424-*a* to a threshold ratio and/or comparing DTR information 426-*b* to a threshold rate. In some examples, AMR information 424-*a* and DTR information 426-*b* may have been gathered by monitor module 422-2 while monitoring the activity of processor circuitry 122.

In some examples, apparatus 400 may also include a power state module 422-4. Power state module 422-4 may be capable of changing a power state of processor circuitry. According to some examples, power state module 422-4 may cause or initiate power state change 432-*e* based on whether processor circuitry is underutilized as indicated by utilization information 428-*c* and based on comparison results 430-*d* associated with the AMR comparison to the threshold ratio or the DTR comparison to the threshold rate. As mentioned above for FIGS. 2 and 3, the power state of the processor circuitry may be raised or lowered based on the determined utilization rate and one or more of the comparisons.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates a logic flow 500 for managing or controlling computing devices in accordance with one or more examples. Logic flow 500 may be performed by various systems and/or devices and may be implemented as hardware, software, and/or any combination thereof, as desired for a given set of design parameters or performance constraints. For example, the logic flow 500 may be implemented by a logic device (e.g., power and performance sub-system 130) and/or logic (e.g., instructions, data, and/or code) to be executed by a logic device. For purposes of illustration, and not limitation, the logic flow 500 is described with reference to FIGS. 1-4.

According to some examples, logic flow 500 may monitor activity of a first processor circuitry in a first processor socket to determine a utilization rate of the first processor circuitry at block 502. For example, monitor module 422-2 of power and performance sub-system 130 may monitor activity of processor circuitry 122 to determine a utilization rate of processor circuitry 122. Monitored activity may also include gathering information associated with data traffic between processor circuitry 112 and 122 via one or more communication links from among C.L.s 140-1 to 140-n.

In some examples, logic flow 500 may make comparison(s) to threshold(s) at block 504. Logic flow 500 may compare an AMR of a cache for the first processor circuitry to a threshold ratio at block 506 or may compare a DTR between the first processor circuitry and a second processor circuitry in a second processor socket at block 508. For an example of the AMR comparison, comparison module 422-3 of power and performance sub-system 130 may compare an AMR of a cache for processor circuitry 122 to a threshold ratio (e.g., 0.5). For an example of the DTR comparison, comparison module 422-3 may compare a DTR for data traffic routed via one or more communication links from among C.L.s 140-1 to 140-n to a threshold rate (e.g., 5 GB/s).

According to some examples, logic flow 500 may change a power state of the first processor circuitry based on the utilization rate and at least one comparison to a threshold at block 510. For example, power state module 422-4 may either raise or lower a power state of processor circuitry 122 based on the utilization rate and based on a comparison of the AMR to the threshold ratio and/or based on the comparison of the DTR to the threshold rate.

Figure 6:
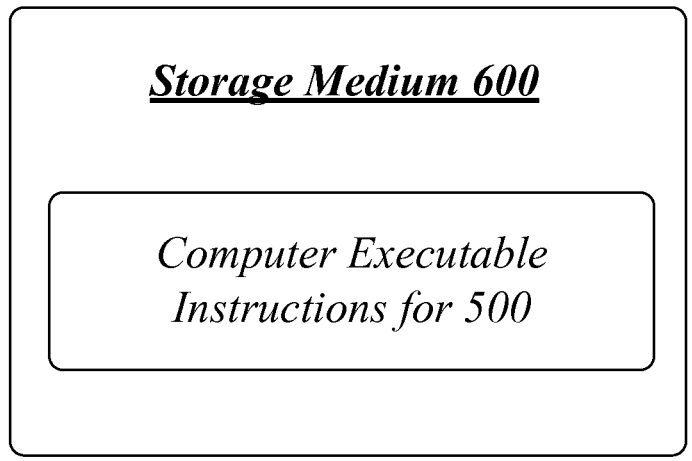
FIG. 6 illustrates an example storage medium.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
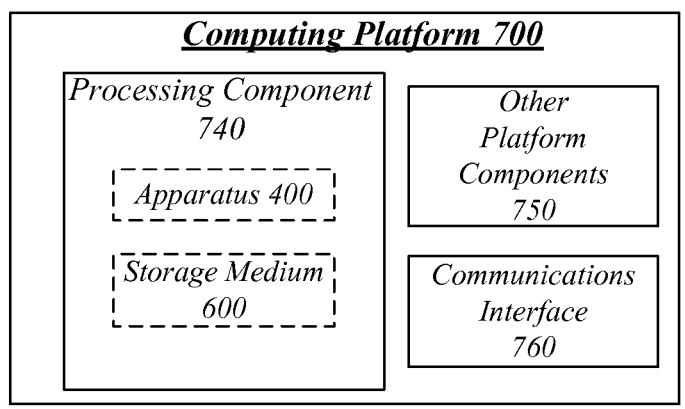
FIG. 7 illustrates an example computing platform.

FIG. 7 illustrates an example computing platform 700. In some examples, as shown in FIG. 7, computing platform 700 may include a processing component 740, other platform components or a communications interface 760. According to some examples, computing platform 700 may be implemented in a computing device such as a multi-processor socket server in order to provide logic and/or features to support managing power and performance of multi-socket processors or processor circuitry included in a system as mentioned above.

According to some examples, processing component 740 may execute processing operations or logic for apparatus 400 and/or storage medium 600. Processing component 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 750 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols or standards described in one or more industry standards (including progenies and variants) such as those associated with the System Management Bus (SMBus) specification, the PCI Express specification, the Serial Advanced Technology Attachment (SATA) specification or the Universal Serial Bus (USB) specification. Network communications may occur via use of communication protocols or standards such those described in the Ethernet standard.

Computing platform 700 may be part of a computing device that may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 700 described herein, may be included or omitted in various embodiments of computing platform 700, as suitably desired.

The components and features of computing platform 700 may be implemented using any combination of discrete circuitry, application specific integrated circuits (ASICs), logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, example methods may include monitoring activity of a first processor circuitry in a first processor socket to determine a utilization rate of the first processor circuitry. The first processor circuitry may be coupled to a second processor in a second processor socket via one or more communication links. The one or more communication links may be capable of providing access to a cache for the first processor circuitry. The cache for the first processor circuitry may be operated at a same clock frequency as the first processor circuitry. A first power state of the first processor circuitry may be changed based on the utilization rate.

According to some examples for the example methods, access to the cache for the first processor circuitry may be provided in order to facilitate execution of an application by the second processor circuitry. The application may be utilizing both the cache for the first processor circuitry and a cache for the second processor circuitry while being executed by the second processor circuitry.

In some examples for the example methods, the cache of the first processor circuitry may include on-die volatile memory.

In some examples for the example methods, the cache for the first processor circuitry may be last level cache (LLC).

According to some examples for the example methods, the one or more communication links may include one or more point-to-point processor interconnects.

In some examples for the example methods, a comparison of an active memory ratio of the cache for the first processor circuitry to a threshold ratio may be made or a comparison of a data traffic rate between the first and second processor circuitry via the one or more communication links to a threshold rate may also be made. In addition to the first power state of the first processor circuitry being changed based on the utilization rate, the first power state may also be changed based on the comparison of the active memory ratio to the threshold ratio or based on the comparison of the data traffic rate to the threshold rate.

In some examples for the example methods, the active memory ratio of the cache for the first processor circuitry may include an amount of available active memory compared to a total memory capacity of the cache for the first processor circuitry.

According to some examples for the example methods, the data traffic rate between the first and second processor circuitry via the one or more communication links may include an inter-socket data traffic rate associated with a number of data packets for read or write access to the cache for the first processor circuitry by the second processor circuitry over a given time period.

In some examples for the example methods, changing the first power state to a second power state may include changing the first power state to a higher power state.

According to some examples for the example methods, the monitored utilization rate may indicate that the first processor circuitry is underutilized and the comparison of the active memory ratio to the threshold ratio may indicate that the active memory ratio is higher that the threshold ratio.

In some examples for the example methods, the monitored utilization rate may indicate that the first processor circuitry is underutilized and the comparison of the data traffic to the threshold rate indicating that the data traffic rate is higher than the threshold rate.

According to some examples, at least one machine readable medium comprising a plurality of instructions that in response to being executed on a system cause the system to carry out the example method as mentioned above.

According to some examples, an example first apparatus having various modules. For these examples, the various modules may include a monitor module operative to monitor a utilization rate of a first processor circuitry in a first processor socket. The first processor circuitry may be coupled to a second processor in a second processor socket via one or more communication links capable of providing access to a cache for the first processor circuitry that may be operated within a same clock frequency or power management domain as the first processor circuitry. The example first apparatus may also include a power state module operative to change a first power state of the first processor circuitry based on the utilization rate.

In some examples for the example first apparatus, the cache of the first processor circuitry may include on-die volatile memory.

According to some examples for the example first apparatus, the one or more communication links may include one or more point-to-point processor interconnects.

In some examples, the example first apparatus may also include a comparison module operative to compare an active memory ratio of the cache for the first processor circuitry to a threshold ratio or comparing a data traffic rate between the first and second processor circuitry via the one or more communication links to a threshold rate. The power state module may also be operative to change the first power state of the first processor circuitry based on the utilization rate and based on the comparison of the active memory ratio to the threshold ratio or based on the comparison of the data traffic rate to the threshold rate.

In some examples for the example first apparatus, the monitor module may be operative to determine that the utilization rate indicates the first processor circuitry is underutilized. The comparison module may be operative to determine that the comparison of the active memory ratio to the threshold ratio indicates that the active memory ratio is higher than the threshold ratio. The power state module may be operative to change the first power state to a higher power state based on the monitoring module's determination and the comparison module's determination.

According to some examples for the example first apparatus, the monitor module may be operative to determine that the utilization rate indicates the first processor circuitry is underutilized. The comparison module may be operative to determine that the comparison of the data traffic rate to the threshold rate indicates that the data traffic rate is higher than the threshold rate. The power state module may be operative to change the first power state to a higher power state based on the monitoring module's determination and the comparison module's determination.

In some examples for the example first apparatus, the monitor module may be operative to determine that the utilization rate indicates the first processor circuitry is underutilized. The comparison module may be operative to determine that the comparison of the active memory ratio to the threshold ratio indicates that the active memory ratio is lower than the threshold ratio. The power state module may be operative to change the first power state to a lower power state based on the monitoring module's determination and the comparison module's determination.

According to some examples for the example first apparatus, the monitor module may be operative to determine that the utilization rate indicates the first processor circuitry is underutilized. The comparison module may be operative to determine that the comparison of the data traffic rate to the threshold rate indicates that the data traffic rate is lower than the threshold rate. The power state module may be operative to change the first power state to a lower power state based on the monitoring module's determination and the comparison module's determination.

According to some examples, an example second apparatus may include means for monitoring activity of a first processor circuitry in a first processor socket to determine a utilization rate of the first processor circuitry. The first processor circuitry may be coupled to a second processor in a second processor socket via one or more communication links capable of providing access to a cache for the first processor circuitry that may be operated at a same clock frequency as the first processor circuitry. The example second apparatus may also include means for changing a first power state of the first processor circuitry to a higher power state based on the utilization rate.

In some examples, the example second apparatus may also include means for comparing an active memory ratio of the cache for the first processor circuitry to a threshold ratio or comparing a data traffic rate between the first and second processor circuitry via the one or more communication links to a threshold rate. The example second apparatus may also include means for changing the first power state of the first processor circuitry to a higher power state based on the utilization rate and based on the comparison of the active memory ratio to the threshold ratio or based on the comparison of the data traffic rate to the threshold rate.

In some examples for the example second apparatus, the monitored utilization rate may indicate that the first processor circuitry is underutilized and the comparison of the active memory ratio to the threshold ratio may indicate that the active memory ratio is higher that the threshold ratio.

According to some examples for the example second apparatus, the monitored utilization rate may indicate that the first processor circuitry is underutilized and the comparison of the data traffic to the threshold rate may indicate that the data traffic rate is higher than the threshold rate.

In some examples for the example second apparatus, the cache of the first processor circuitry comprising on-die volatile memory.

According to some examples for the example second apparatus, the one or more communication links comprising one or more point-to-point processor interconnects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
monitoring activity of a first processor circuitry in a first processor socket to determine a utilization rate of the first processor circuitry, the first processor circuitry coupled to a second processor in a second processor socket via one or more communication links capable of providing access to a cache for the first processor circuitry that is operated at a same clock frequency as the first processor circuitry; and
changing a first power state of the first processor circuitry based on the utilization rate.

2. The method of claim 1, comprising:
providing access to the cache for the first processor circuitry in order to facilitate execution of an application by the second processor circuitry, the application utilizing both the cache for the first processor circuitry and a cache for the second processor circuitry while being executed by the second processor circuitry.

3. The method of claim 1, the cache of the first processor circuitry comprising on-die volatile memory.

4. The method of claim 1, the cache comprising a last level cache (LLC) for the first processor circuitry.

5. The method of claim 1, the one or more communication links comprising one or more point-to-point processor interconnects.

6. The method of claim 1, comprising:
comparing an active memory ratio of the cache for the first processor circuitry to a threshold ratio or comparing a data traffic rate between the first and second processor circuitry via the one or more communication links to a threshold rate; and
changing the first power state based on the comparison of the active memory ratio to the threshold ratio or based on the comparison of the data traffic rate to the threshold rate.

7. The method of claim 6, the active memory ratio of the cache for the first processor circuitry comprise an amount of available active memory compared to a total memory capacity of the cache for the first processor circuitry.

8. The method of claim 6, the data traffic rate between the first and second processor circuitry via the one or more communication links comprises an inter-socket data traffic rate associated with a number of data packets for read or write access to the cache for the first processor circuitry by the second processor circuitry over a given time period.

9. The method of claim 6, comprising changing the first power state to a second power state that is higher than the first power state.

10. The method of claim 9, comprising the monitored utilization rate indicating that the first processor circuitry is underutilized and the comparison of the active memory ratio to the threshold ratio indicates that the active memory ratio is higher than the threshold ratio.

11. The method of claim 9, comprising the monitored utilization rate indicating that the first processor circuitry is underutilized and the comparison of the data traffic to the threshold rate indicates that the data traffic rate is higher than the threshold rate.

12. The method of claim 6, comprising changing the first power state to a second power state that is lower than the first power state.

13. The method of claim 12, comprising the monitored utilization rate indicating that the first processor circuitry is underutilized and the comparison of the active memory ratio to the threshold ratio indicates that the active memory ratio is lower than the threshold ratio.

14. The method of claim 12, comprising the monitored utilization rate indicating that the first processor circuitry is underutilized and the comparison of the data traffic rate to the threshold rate indicating that the data traffic rate is lower than the threshold rate.

15. An apparatus comprising:
a monitor module operative to monitor a utilization rate of a first processor circuitry in a first processor socket, the first processor circuitry coupled to a second processor in a second processor socket via one or more communication links capable of providing access to a cache for the first processor circuitry that is operated within a same clock frequency or power management domain as the first processor circuitry; and
a power state module operative to change a first power state of the first processor circuitry based on the utilization rate.

16. The apparatus of claim 15, the cache of the first processor circuitry comprising on-die volatile memory.

17. The apparatus of claim 15, the one or more communication links comprising one or more point-to-point processor interconnects.

18. The apparatus of claim 15, the cache comprising a last level cache (LLC) for the first processor circuitry.

19. The apparatus of claim 15, comprising:
a comparison module operative to compare an active memory ratio of the cache for the first processor circuitry to a threshold ratio or comparing a data traffic rate between the first and second processor circuitry via the one or more communication links to a threshold rate; and the power state module also operative to change the first power state based on the comparison of the active memory ratio to the threshold ratio or based on the comparison of the data traffic rate to the threshold rate.

20. The apparatus of claim 19, the monitor module operative to determine that the utilization rate indicates the first processor circuitry is underutilized, the comparison module operative to determine that the comparison of the active memory ratio to the threshold ratio indicates that the active memory ratio is higher than the threshold ratio, and the power state module operative to change the first power state to a higher power state based on the monitoring module's determination and the comparison module's determination.

21. The apparatus of claim 19, the monitor module operative to determine that the utilization rate indicates the first processor circuitry is underutilized, the comparison module operative to determine that the comparison of the data traffic rate to the threshold rate indicates that the data traffic rate is higher than the threshold rate, and the power state module operative to change the first power state to a higher power state based on the monitoring module's determination and the comparison module's determination.

22. The apparatus of claim 19, the monitor module operative to determine that the utilization rate indicates the first processor circuitry is underutilized, the comparison module operative to determine that the comparison of the active memory ratio to the threshold ratio indicates that the active memory ratio is lower than the threshold ratio, and the power state module operative to change the first power state to a lower power state based on the monitoring module's determination and the comparison module's determination.

23. The apparatus of claim 19, the monitor module operative to determine that the utilization rate indicates the first processor circuitry is underutilized, the comparison module operative to determine that the comparison of the data traffic rate to the threshold rate indicates that the data traffic rate is lower than the threshold rate, and the power state module operative to change the first power state to a lower power state based on the monitoring module's determination and the comparison module's determination.

24. At least one machine readable medium comprising a plurality of instructions that in response to being executed on a system cause the system to:

monitor activity of a first processor circuitry in a first processor socket to determine a utilization rate of the first processor circuitry, the first processor circuitry coupled to a second processor in a second processor socket via one or more communication links capable of providing access to a cache for the first processor circuitry that is operated at a same clock frequency as the first processor circuitry; and cause a first power state of the first processor circuitry to be changed to a higher power state based on the utilization rate.

25. The at least one machine readable medium of claim 24, the plurality of instructions to also cause the system to:

compare an active memory ratio of the cache for the first processor circuitry to a threshold ratio or comparing a data traffic rate between the first and second processor circuitry via the one or more communication links to a threshold rate; and cause the first power state of the first processor circuitry to be changed to the higher power state based on the comparison of the active memory ratio to the threshold ratio or based on the comparison of the data traffic rate to the threshold rate.

26. The at least one machine readable medium of claim 25, comprising the monitored utilization rate indicating that the first processor circuitry is underutilized and the comparison of the active memory ratio to the threshold ratio indicates that the active memory ratio is higher that the threshold ratio.

27. The at least one machine readable medium of claim 25, comprising the monitored utilization rate indicating that the first processor circuitry is underutilized and the comparison of the data traffic to the threshold rate indicates that the data traffic rate is higher than the threshold rate.

28. The at least one machine readable medium of claim 24, the cache of the first processor circuitry comprising on-die volatile memory.

29. The at least one machine readable medium of claim 24, the one or more communication links comprising one or more point-to-point processor interconnects.

30. The at least one machine readable medium of claim 24, the cache comprising a last level cache (LLC) for the first processor circuitry.

* * * * *